United States Patent
Zhang et al.

(10) Patent No.: US 7,977,285 B2
(45) Date of Patent: Jul. 12, 2011

(54) HYDROCARBON FLUID COMPOSITIONS AND METHODS FOR USING SAME

(75) Inventors: Kewei Zhang, Calgary (CA); Bill O'Neil, Calgary (CA); Darren Maley, Calgary (CA)

(73) Assignee: Trican Well Service Ltd., Calgary, Alberta (CA)

( * ) Notice: Subject to any disclaimer, the term of this patent is extended or adjusted under 35 U.S.C. 154(b) by 0 days.

(21) Appl. No.: 12/613,350

(22) Filed: Nov. 5, 2009

(65) Prior Publication Data

US 2010/0113308 A1    May 6, 2010

(30) Foreign Application Priority Data

Nov. 5, 2008 (CA) ..................................... 2643251

(51) Int. Cl.
*C09K 8/64* (2006.01)
*E21B 43/26* (2006.01)

(52) U.S. Cl. .................. 507/269; 166/305.1; 166/308.1; 166/308.6; 507/260; 507/261; 507/266; 507/267

(58) Field of Classification Search .................. 507/269, 507/260, 261, 266, 267; 166/305.1, 308.1, 166/308.6
See application file for complete search history.

(56) References Cited

U.S. PATENT DOCUMENTS

| | | | |
|---|---|---|---|
| 3,361,213 A | 1/1968 | Savins | |
| 3,373,107 A | 3/1968 | Rice et al. | |
| 3,505,374 A | 4/1970 | Monroe | |
| 3,757,864 A | 9/1973 | Crawford et al. | |
| 3,864,137 A * | 2/1975 | Van Bonin et al. | 106/603 |
| 3,980,136 A | 9/1976 | Plummer et al. | |
| 3,990,978 A | 11/1976 | Hill | |
| 4,003,393 A | 1/1977 | Jaggard et al. | |
| 4,007,128 A | 2/1977 | Poklacki | |
| 4,061,580 A | 12/1977 | Jahnke | |
| 4,316,810 A | 2/1982 | Burnham | |
| 4,780,220 A | 10/1988 | Peterson | |
| 5,110,485 A | 5/1992 | Huddleston | |
| 5,693,837 A | 12/1997 | Smith et al. | |
| 5,858,928 A | 1/1999 | Aubert et al. | |
| 6,187,720 B1 | 2/2001 | Acker et al. | |
| 6,297,210 B1 | 10/2001 | Hsu et al. | |
| 6,649,571 B1 | 11/2003 | Morgan | |
| 6,729,409 B1 | 5/2004 | Gupta et al. | |
| 2004/0082055 A1 * | 4/2004 | Hince et al. | 435/262.5 |
| 2007/0129257 A1 | 6/2007 | Kippie et al. | |
| 2007/0197402 A1 | 8/2007 | O'Neil et al. | |
| 2010/0029515 A1 | 2/2010 | O'Neil et al. | |

FOREIGN PATENT DOCUMENTS

| | | |
|---|---|---|
| CA | 2531982 | 7/2007 |
| CA | 2547150 | 1/2010 |
| SU | 1126590 | 11/1984 |

* cited by examiner

*Primary Examiner* — Timothy J. Kugel
(74) *Attorney, Agent, or Firm* — Dunlap Codding, P.C.

(57) ABSTRACT

Hydrocarbon fluid compositions comprising a liquid hydrocarbon, an aluminum soap, a hydrocarbon foaming agent and a gas. The fluids can be used in various oil field operations.

12 Claims, No Drawings

HYDROCARBON FLUID COMPOSITIONS AND METHODS FOR USING SAME

CROSS REFERENCE TO RELATED APPLICATIONS

This application claims priority from Canadian Patent Application No. 2,643,251, filed Nov. 5, 2008.

BACKGROUND OF THE INVENTION

1. Field of the Invention

This invention relates to hydrocarbon fluid compositions and their use in industrial applications in general.

2. Brief Description of Related Art

Fluids are widely used in many industries, especially in the petroleum industry where different fluids are used in different operations including drilling, completion, wellbore cleaning, stimulation, and pipeline cleaning operations. There are two general classes of fluids: water-based fluids and non-aqueous based fluids. Alcohol-based fluids and hydrocarbon-based fluids are generally classified as non-aqueous fluids.

In general, when fluids are used in subterranean operations, the nature of the subterranean formation to a large extent dictates which types of fluids are suitable for use in such operations. Due to their low cost and high versatility, water-based fluids are normally preferred. However, certain subterranean formations are susceptible to water. When exposed to water, hydrocarbon production may decrease in such formations because of clay swelling and migration. For such water-sensitive formations, hydrocarbon-based fluids are generally preferred.

For drilling in water-sensitive formations, invert emulsion muds (fluid compositions containing a certain amount of water emulsified in oil), are widely used. An emulsion can be defined as the dispersion of one liquid, called internal phase, in another liquid, called the external or continuous phase. In invert emulsion muds, water droplets are dispersed in oil. Normally invert emulsion muds can contain about 50% of water. The disadvantages of the invert emulsion muds are their high costs and the extensive preparation and quality control required.

Hydraulic fracturing has been used for decades to enhance petroleum production. In hydraulic fracturing operations, a fracturing fluid is injected through a wellbore into the formation at a pressure sufficient to overcome the overburden stress and thus initiate fractures in the formation. Following the initiation of the fractures, solid particles called proppants, are mixed in the fracturing fluid and transported into the fractures. The function of proppants is to prevent the fractures from closing back when the pressure is released. There are different proppants including sands, ceramics, resin-coated sands and the like. The most common proppants are sands. The proppant-filled fractures provide highly permeable channels allowing petroleum to seep efficiently through the fractures into the wellbore.

Water-based fracturing fluids are by far the most commonly used. For water-sensitive formations, however, hydrocarbon-base fracturing fluids are generally preferred. To improve solid-carrying capability, hydrocarbon fluids are often gelled by adding gelling agents. There are two major types of gelling agents: alkyl phosphate esters crosslinked by aluminum or iron salts, and aluminum fatty acid salts including aluminum octoate and aluminum stearate.

In the oil field operations, especially in fracturing operations, alkyl phosphate esters crosslinked by aluminum or iron salts are widely used. To prepare the fluid a phosphate ester and an aluminum or iron salts are mixed into a hydrocarbon liquid. The in situ reaction between the phosphate ester and the aluminum or iron salt form aluminum or iron phosphate esters which further form three-dimensional networks gelling the hydrocarbon fluid. This method is well known in the art and examples can be found in U.S. Pat. Nos. 3,505,374; 3,990,978; 4,003,393; 4,316,810; 5,110,485; 5,693,837 and 6,297,210.

Recently, however, it has been found that excess amounts of phosphorus residues in crude oil causes fouling problems in refinery towers. To clean out the fouling, refinery towers have to be prematurely shut-down, at significant financial cost. It is believed that the excess amount of phosphorus residues in crude oil stems mainly from the phosphate esters used in the hydrocarbon-based fracturing fluids. Therefore, there is a general demand for fracturing and other well operations to use hydrocarbon-based fluids which contain no phosphate esters while at the same time have good solid carrying capability and low fluid loss.

An alternative is to use aluminum soaps, which contain no phosphorous, to gel the hydrocarbon fluids for oil field operations, in particular for fracturing operations. Aluminum soaps have been used to gel hydrocarbon fluids in many applications, especially in ink industry.

Unfortunately, compared to aluminum or ferric phosphate ester, hydrocarbon fluids gelled by the aluminum soaps such as aluminum octoate is in general less viscoelastic, or in order to achieve comparable viscoelastic property more aluminum octoate is required, which increases the cost. Good viscoelasticity is important for carrying solid particles such as proppants.

SUMMARY OF THE INVENTION

According to one aspect, the invention relates to a hydrocarbon fluid composition comprising of a liquid hydrocarbon, an aluminum soap, a hydrocarbon foaming agent and a gas, and the method of using such a composition in a well service operation.

DETAILED DESCRIPTION OF THE INVENTION

Among the aluminum soaps, aluminum octoate and aluminum stearate are well known. The aluminum soaps useful for the invention are made by reacting a fatty acid, such as ethyl, octyl, and decyl or stearic acid with an alkoxide such as aluminum isopropoxide and aluminum sec-butoxide. The resulting products are a mixture of aluminum mono- and di-fatty acid soaps, which can be represented by the following general formula:

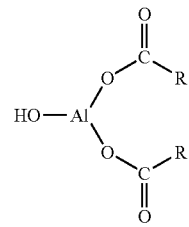

where R is a straight or branched chain alkyl group having 6 to 18 carbon atoms.

When the aluminum soap, for example aluminum octoate, is mixed into a hydrocarbon fluid including kerosene, diesel, gasoline and other aliphatic and aromatic hydrocarbons a three-dimension network forms resulting in the formation of gel represented by the formula:

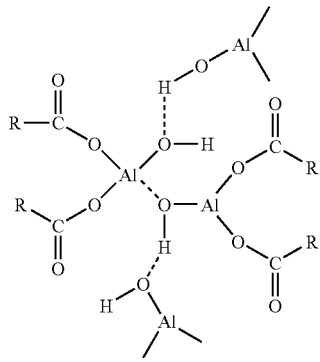

By foaming the hydrocarbon fluid containing the aluminum soap the solid-carrying capability of the fluid is improved greatly. Furthermore, the fluid has low friction and low fluid lose; it is easy to flow back from wells after the operation due to the energized gas contained in the fluid, and finally it is cost effective because of less additives are required. This fluid can find many applications including hydraulic fracturing, drilling, wellbore clean out and pipeline cleaning.

Known aluminum soaps, as indicated above, can be used. The liquid hydrocarbon can be diesel, kerosene or other aliphatic hydrocarbons. Unlike in water-base fluids where the majority of conventional hydrocarbon surfactants can be used as a foaming agent, the hydrocarbon foaming agents which are preferred for use in accordance with the presence invention are certain fluorinated surfactants or silicone-base hydrocarbon foaming agents. Different gases including air, nitrogen, carbon oxide, natural gas, propane and mixtures thereof can be used.

After operations completed, the fluids flow out the wells and can be reused. To adequately store the flowback fluid, the fluid has to be defoamed immediately after the operations. In the present invention we have found that conventional defoamer such as emulsified silicone oil or 2-ethylhexanol is ineffective in defoaming the fluid. In the present invention we have found that the fluids can be defoamed by methanol or ethanol at apperporate concentration.

It notes that the increased viscosity of the gelled fluid enhances the stability of the foam. On the other hand, high viscosity of the fluid may impede formation of sufficient amount of foam. The requisite balance between the fluid viscosity and foamability can be determined by simple lab tests.

The following example is presented to illustrate the preparation and the properties of the fluids and should not be construed to limit the scope of the invention. The foam fluid properties, namely the foam quality and half-life have been measured. The foam quality is quantified as the percentage increase in volume after foaming. Foam half-life is quantified as the time taken when half of the fluid is recovered from the foam.

Example 0.4 gram of aluminum octoate (Calford 760) was dissolved into 200 ml of frac oil (Fracsol), and then 2.0 ml of L 16394A, a fluoro-base hydrocarbon foaming agent from 3M Company, was added. The fluid was mixed with a high speed blender for 2 minutes at room temperature. Good foamability was observed. The foam quality was 55% and the foam half-life was 2 minutes.

What is claimed:

1. A non-aqueous hydraulic fracturing fluid composition comprising a liquid hydrocarbon, an aluminum soap, a hydrocarbon foaming agent and a gas.

2. The composition of claim 1 further comprising a defoaming agent.

3. The composition of claim 2 wherein the defoaming agent is methanol or ethanol.

4. The composition of claim 1 wherein the liquid hydrocarbon is an aliphatic hydrocarbon.

5. The composition of claim 1 wherein the aluminum soap is aluminum octoate.

6. The composition of claim 5 wherein the composition is a gel having the formula:

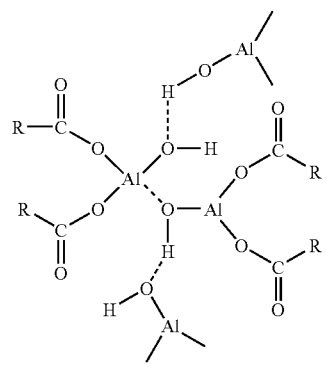

where R is a straight or branched chain alkyl group having 6 to 18 carbon atoms.

7. The composition of claim 1 wherein the hydrocarbon foaming agent comprises a fluoro-based hydrocarbon foaming agent.

8. The composition of claim 1 wherein the hydrocarbon foaming agent comprises a silicone-based hydrocarbon foaming agent.

9. The composition of claim 1 wherein the aluminum soap is represented by the following general formula:

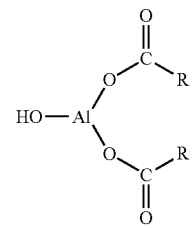

where R is a straight or branched chain alkyl group having 6 to 18 carbon atoms.

10. The composition of claim 1 wherein the liquid hydrocarbon is kerosene, diesel or gasoline.

11. The composition of claim 1 wherein the liquid hydrocarbon is an aromatic hydrocarbon.

12. The composition of claim 1 wherein the liquid hydrocarbon is a frac oil.

* * * * *